US007062472B2

United States Patent
Dan et al.

(10) Patent No.: US 7,062,472 B2
(45) Date of Patent: Jun. 13, 2006

(54) ELECTRONIC CONTRACTS WITH PRIMARY AND SPONSORED ROLES

(75) Inventors: Asit Dan, Pleasantville, NY (US); Gautam Kar, Yorktown Heights, NY (US); Alexander Keller, Mamaroneck, NY (US); Heiko Hary Ludwig, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 10/017,814

(22) Filed: Dec. 14, 2001

(65) Prior Publication Data

US 2003/0115149 A1 Jun. 19, 2003

(51) Int. Cl.
G06F 17/00 (2006.01)
(52) U.S. Cl. ............................................. 705/80; 705/1
(58) Field of Classification Search .................... 705/1, 705/50, 80; 370/230, 237, 238, 431; 709/201, 709/208, 209, 204; 717/104
See application file for complete search history.

(56) References Cited

U.S. PATENT DOCUMENTS

| 5,742,772 | A | * | 4/1998 | Sreenan ...................... 370/431 |
| 5,799,151 | A | * | 8/1998 | Hoffer ......................... 709/219 |
| 6,148,290 | A | * | 11/2000 | Dan et al. ....................... 705/1 |
| 6,266,805 | B1 | * | 7/2001 | Nwana et al. ................ 717/104 |
| 6,401,111 | B1 | * | 6/2002 | Dan et al. ..................... 709/204 |
| 6,490,252 | B1 | * | 12/2002 | Riggan et al. ................ 370/237 |
| 6,529,950 | B1 | * | 3/2003 | Lumelsky et al. ............ 709/218 |
| 6,594,633 | B1 | * | 7/2003 | Broerman ...................... 705/1 |
| 6,691,148 | B1 | * | 2/2004 | Zinky et al. .................. 709/201 |
| 2002/0198840 | A1 | * | 12/2002 | Banka et al. .................. 705/50 |

FOREIGN PATENT DOCUMENTS

JP 8-214092 * 8/1996

OTHER PUBLICATIONS

"Electronic records and signatures under federal E-SIGN and the UETA", Wittie et al, Business Lawyer, vol. 56, No. 1, p. 293 et seq, (Nov. 2000).*

* cited by examiner

*Primary Examiner*—Salvatore Cangialosi
(74) *Attorney, Agent, or Firm*—Stephen C. Kaufman

(57) ABSTRACT

Computer-based methods and systems are provided for constructing, deploying, executing and managing the performance of electronic contract based service applications across multiple business entities. In this context, the electronic service contract includes information to be used for configuration and enforcement not just by the primary parties to the contract, but also by other parties referred to herein as sponsored roles in the contract. At least a portion of the contract may be monitored, enforced or managed by at least one of the sponsored roles. In one aspect of the invention, a computer-based electronic business service system includes: (1) a contract builder; (2) a contract deployment component; (3) one or more measurement systems; (4) a violation detection system; and (5) a management system. Generally, the contract builder component provides the mechanism for defining and pricing the contract, checking the validity of the contract and a repository for storing the completed contracts. The deployment system is responsible for configuring the (run-time) system in order to meet one or a set of contracts. The measurement system maintains information on the current system configuration, and run-time information on the metrics that are part of the contract. The violation detection system is responsible for comparing measured parameters against the thresholds defined in the contract and notifying the management system. Upon receipt of a notification, the management system will then issue appropriate actions to correct the problem, as specified in the contract.

31 Claims, 13 Drawing Sheets

ELECTRONIC CONTRACTS WITH PRIMARY AND SPONSORED ROLES

BACKGROUND OF THE INVENTION

1. Technical Field

The present invention relates to service contracts and service systems used in electronic commerce. More particularly, this invention relates to formally specified contracts describing rules for interacting with a service involving primary and sponsored roles, where the service may be provided either as a computer program, or, more generally, as an automated business process involving human agents.

2. Description of Related Art

The Internet has provoked fundamental change in the ways in which services are delivered by service providers and consumed by service customers. One trend that is beginning to emerge from this change is the development of an environment in which service customers and service providers may locate each other over the Internet. Partners negotiate terms and conditions of business electronically, connect with each other dynamically, transact business and even tear down their electronic relationships when they are no longer needed. One of the key elements of this dynamic electronic business or "e-business" is an electronic contract that describes the roles of the parties and the service level agreements (SLAs) that are negotiated between them.

U.S. Pat. No. 6,148,290 to Dan et al. discloses an electronic service contract for managing service transactions in electronic commerce. As described in FIG. 1, the electronic contract 130 captures electronic interactions among a set of business servers 110, 120. The electronic contract 130 captures explicitly all aspects of the server-to-server interactions, including transport protocol(s), document format(s), security policies (signing, non-repudiation, encryption), business roles, associated actions, responsiveness, allowable sequences of messages and exception handling. The contract is used by one or more of the parties to automatically configure their business service application and to monitor and enforce any violation during runtime interactions across business systems.

Pending U.S. patent application Ser. No. 09/642,526, filed on Aug. 18, 2000, entitled "Electronic Service Level Agreement for Web Site and Computer Service Hosting" by Dan et al., discloses the use of electronic contracts for verifiable and enforceable service level agreements for Web hosting. FIG. 2 illustrates an electronic service level agreement (eSLA) 210, which specifies IT resource level metrics (e.g., response time, throughput, availability) and associated guarantees provided by the application hosting server 220 to the service application owner 230 during runtime interaction with service customers 240.

Considerable research has been ongoing on the content and structure of electronic contracts; existing work, however, typically focuses on business-level interactions and is thus on an abstraction level that is too high for the purposes of technical service management. On the other hand, work in the area of service management typically fails to take the business impact of SLAs into account. A need therefore exists for methods and systems that enable dynamic e-business by providing for the deployment and execution of electronic contract based service applications across multiple business entities.

SUMMARY OF THE INVENTION

The present invention provides computer-based methods and systems for constructing, deploying, executing and monitoring the performance of electronic contract based service applications across multiple business entities. In this context, the electronic service contract includes information to be used for configuration and enforcement not just by the primary parties to the contract, but also by other parties referred to as sponsored roles in the contract. Further, at least a portion of the contract may be monitored, enforced or managed by at least one of the sponsored roles and/or a portion of the service provided by at least one of the sponsored roles.

In a preferred embodiment, the computer-based methodology may comprise the following steps:

The electronic service contract is constructed for use in an electronic business service environment between at least two primary parties, wherein the primary parties comprise a service provider and a service customer, and wherein the electronic service contract includes specifications for configuration by the primary parties and by at least one sponsored party.

The electronic service contract is deployed to at least one of the parties for configuring a service in accordance with specifications in the electronic service contract. The deploying step may further comprise the step of setting up a contract monitoring and management infrastructure.

Preferably, information on system configuration is maintained.

After the electronic contract is constructed, it may be executed.

At least a portion of the electronic service contract may be monitored, enforced or managed by at least one sponsored party.

Preferably, the methodology implements a violation detection component for detecting whether a violation of a least a portion of the contract occurs and proposing corrective actions to a management component. Preferably a management component is configured to enforce corrective actions in accordance with specifications in the electronic service contract. The corrective actions may be enforced in response to input associated with the violation detection component.

Preferably one of the primary parties sponsors at least one sponsored party. Optionally, at least one sponsored party is a business entity that is distinct from the primary parties.

Optionally, the electronic service contract may comprise one or more service level agreements. The one or more service level agreements may be deployed to at least one sponsored party for monitoring in accordance with instructions defined in the electronic service contract.

Furthermore, preferably one or more primary parties may be notified by a sponsored party if a violation of a portion of the electronic service contract is detected by the sponsored party.

At least a portion of the tasks associated with the execution of the electronic service contract may be outsourced, preferably to one or more sponsored parties. The sponsored parties may further be service providers.

The methodology of the invention may be carried out in multi-party transactions, wherein the primary parties comprise the service provider, the service customer, and at least one additional entity.

In one aspect of the invention, a computer-based electronic business service system includes (1) a contract builder; (2) a contract deployment component; (3) one or more measurement systems; (4) a violation detection system; and (5) a management system. Generally, the contract builder component provides the mechanism for defining and pricing the contract, checking the validity of the contract and a repository for storing the completed contracts. The deployment system is responsible for configuring the (run-time) system in order to meet one or a set of contracts. The measurement system maintains information on the current system configuration, and run-time information on the metrics that are part of the contract. The violation detection system is responsible for comparing measured parameters against the thresholds defined in the contract and notifying the management system. Upon receipt of a notification, the management system will then issue appropriate actions to correct the problem, as specified in the contract.

Objects, features and advantages of the present invention will become apparent from the following detailed description of illustrative embodiments thereof, which is to be read in connection with the accompanying drawings.

DETAILED DESCRIPTION OF THE PREFERRED EMBODIMENT

Figure 1:
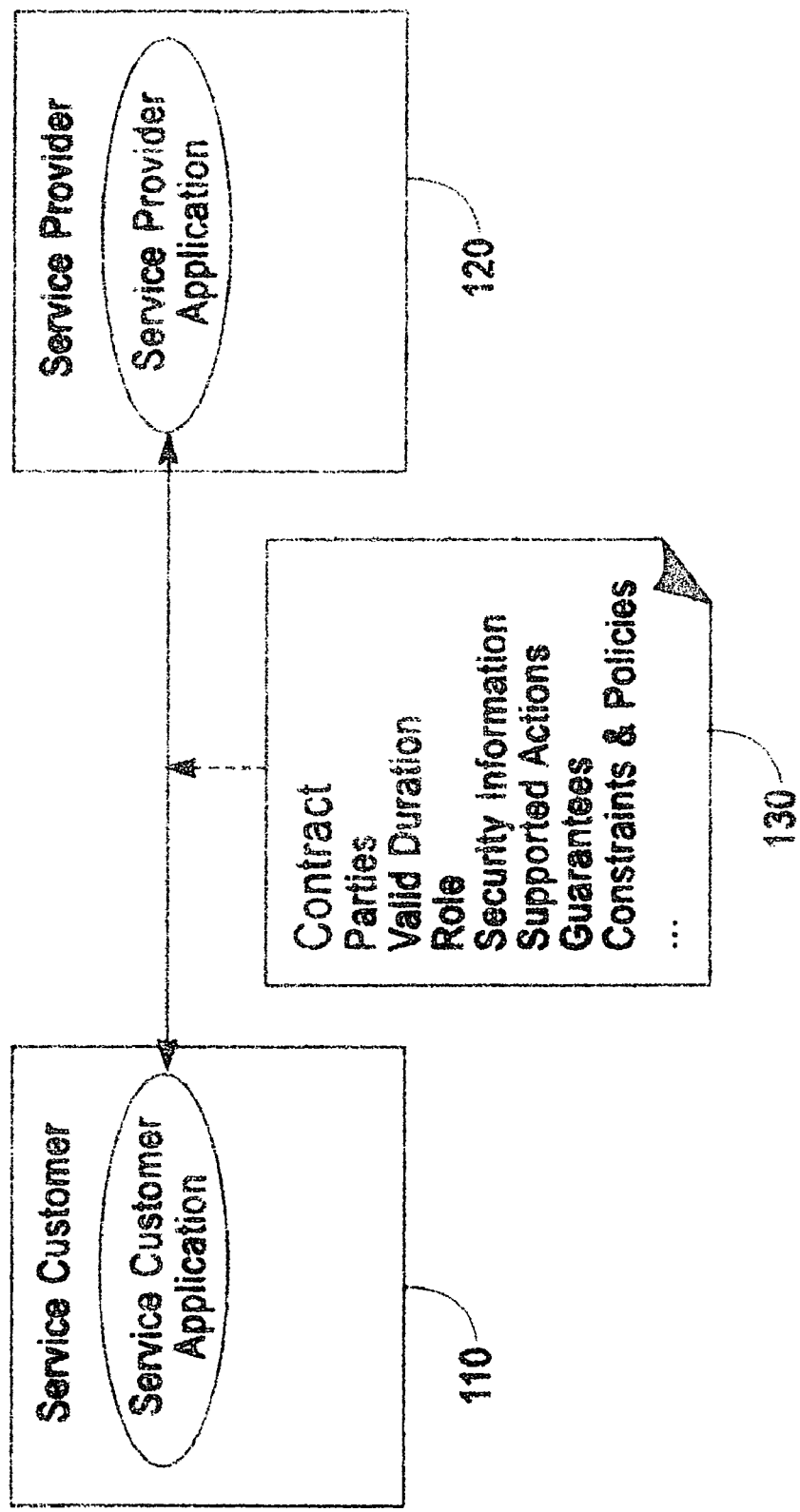
FIG. 1 (PRIOR ART) is a block diagram illustrating a service contract.
Figure 2:
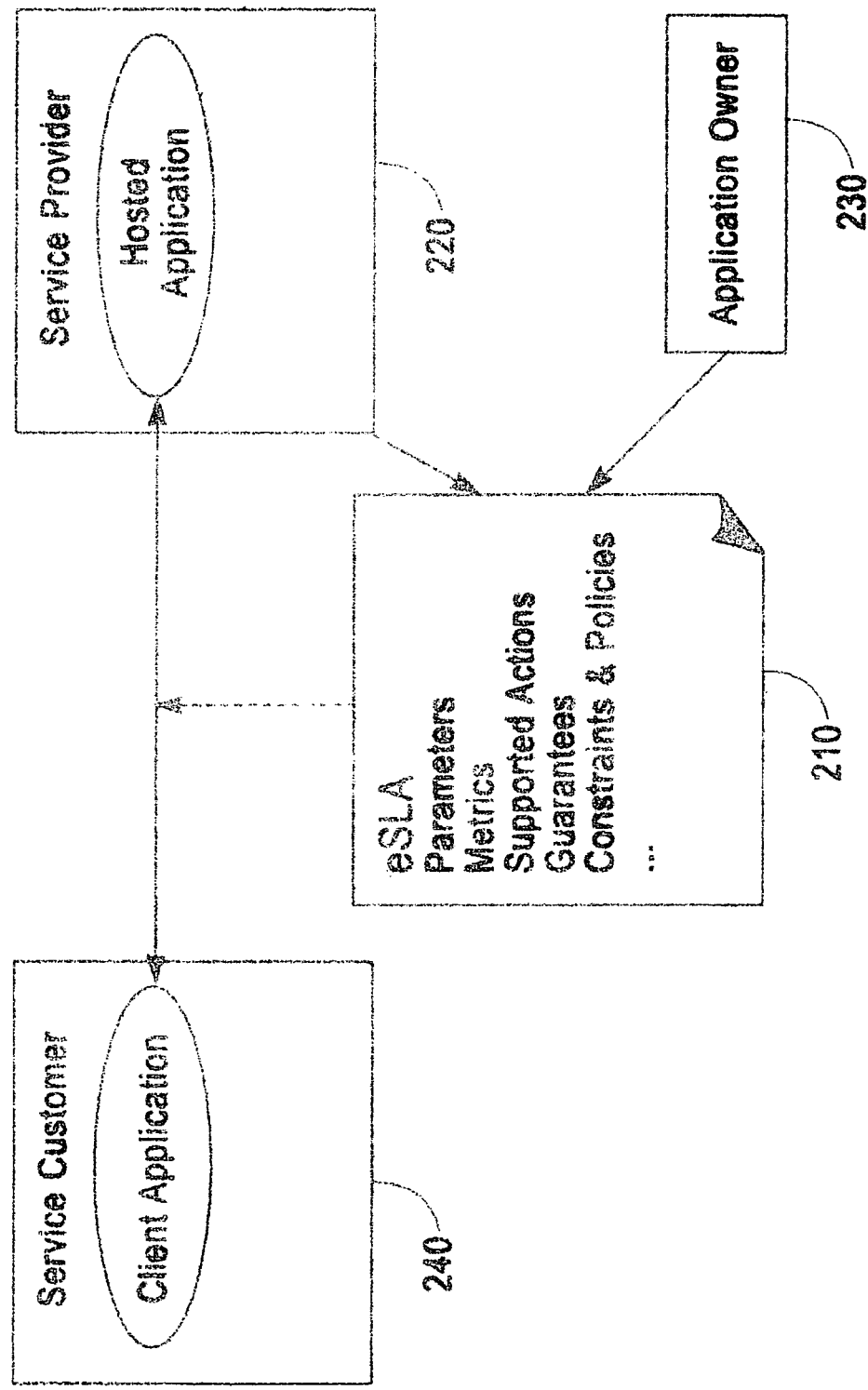
FIG. 2 (PRIOR ART) is a block diagram illustrating an electronic service level agreement (eSLA).

An electronic contract may be used to formally capture interactions between parties, wherein the parties may use an electronic contract to automatically configure their software systems and to enforce terms and conditions specified in the contract. The contract distinguishes two types of roles, primary and sponsored. As used in this specification and the appended claims, the terms "primary role" and "primary parties" refer to parties who are held accountable for any violation of the agreed upon terms for their role or roles. Primary parties may also be players who participate in the creation, negotiation and/or signing of a specific contract. As used in this specification and the appended claims, the terms "sponsored role" and "sponsored parties" refer to parties who are typically sponsored by one or more of the primary role players. For example, in many service scenarios, one or more of the primary parties may require services of one or more other partners who are not primary role players; therefore, they are referred to as sponsored parties.

In contracts that distinguish between primary and sponsored roles, the roles of the sponsored parties are explicitly specified; that is, the services they are expected to perform on behalf of the primary parties are enumerated. Preferably, the primary parties and not the sponsored parties are held accountable under the contract for violations of the services to be performed by the sponsored role players. The partners with sponsored roles, for example, may not be fully aware of the complete contract agreed upon by the primary parties. Also, the primary parties may have separate prior agreements with their corresponding sponsored parties.

The present invention provides computer-based methods and systems for building, deploying and executing electronic contract based service application deployment across multiple businesses or authority domains where the contract includes information to be used for configuration and enforcement not just by the primary roles, but also by other parties referred to as sponsored roles in the contract. Further, the present invention provides a method whereby a contract can be used for Service Level Agreement (SLA) negotiation, monitoring, violation detection and enforcement.

In one aspect of the invention, a computer-based contract system includes five main components: (1) a contract builder; (2) a contract deployment component; (3) one or more measurement systems; (4) a violation detection system; (5) a management system. Generally, the contract builder component provides the mechanism for defining and pricing the contract, checking the validity of the contract and a repository for storing the completed contracts. The deployment system is responsible for configuring the (run-time) system in order to meet one or a set of contracts. The measurement system maintains information on the current system configuration, and run-time information on the metrics that are part of the contract. The violation detection system is responsible for comparing measured parameters against the thresholds defined in the contract and notifying the management system. Upon receipt of a notification, the management system will then issue appropriate actions to correct the problem, as specified in the contract.

The invention also provides a process for enabling dynamic e-business using contracts with primary and sponsored roles whereby a business, e.g., storefront owner, uses various sub providers, e.g., measurement, violation detection for running its overall business process. A service integrator is a broker that may maintain a priori contracts with various sub-service providers, or can create new ones dynamically, and pulls together these sub-services for enabling the overall business process. The business process owner, e.g., storefront, creates a service contract with the service integrator for running this business process, which in turn relies on the sponsored sub-service providers. One specific kind of sponsored service provider is the management service provider, whose purpose is to observe the functioning and the performance of the services offered by the service integrator and the sub-service providers, alerting the involved parties when thresholds for one or more SLA parameter defined in the contract are exceeded, and proposing and enforcing corrective actions. In order to do this, the management service provider implements mapping functions to aggregate and compute SLA parameters (meaningful to the storefront owner) out of metrics gathered from various service providers.

Service management contracts may be used as one specific preferred embodiment. In distributed application service environments, multiple service providers may be involved in delivering parts of a service that are connected together to provide a composite service to a primary recipient. The present invention provides a mechanism to capture and monitor the contractual terms agreed to by a set of sponsored service providers. For example, a travel reservation service provider may use the services of a payment service provider. In such an case, a sponsored role includes not only the payment service provider but also includes a monitoring service provider for monitoring the contractual terms.

Figure 3:
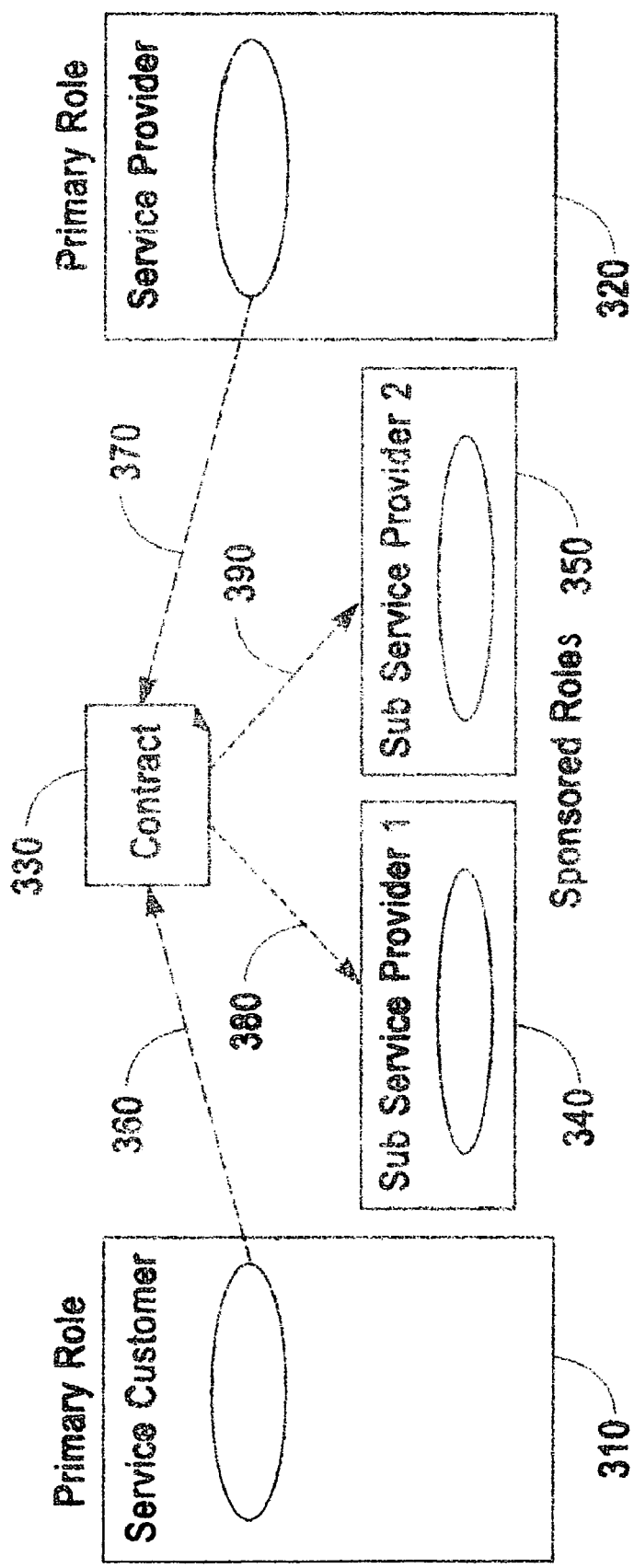
FIG. 3 is a block diagram illustrating the interactions between primary and sponsored parties for establishing and deploying a service contract, according to an embodiment of the present invention.

Referring initially to FIG. 3, a block diagram illustrates the interactions between primary and sponsored parties for establishing and deploying a service contract, according to an embodiment of the present invention. First, the parties acting as primary roles, i.e., primary service customer 310 and primary service provider 320, negotiate and establish 360, 370 the service contract 330. During the establishment phase, further negotiations involving one or more sub service providers 340, 350 acting as sponsored roles may be necessary. Once service contract 330 is established, it is deployed 380, 390, either in part or in full, to the sub service providers 340, 350 so that they become aware of the tasks they are expected to perform. The deployment 380, 390 may optionally include instructions containing detailed procedures and steps or such instructions may be transmitted at a later time.

Figure 4:
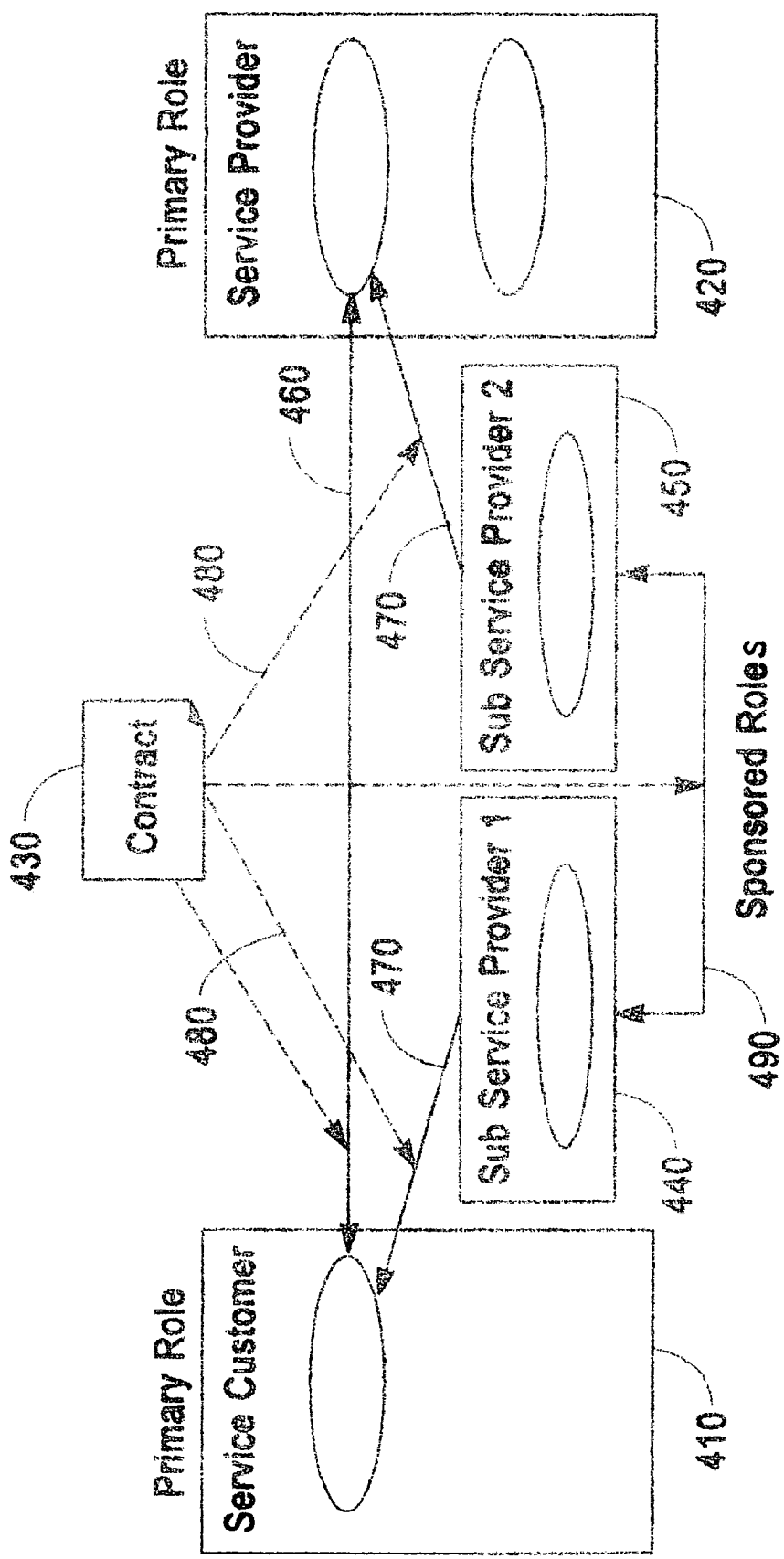
FIG. 4 is a block diagram illustrating the interactions between primary and sponsored parties for runtime monitoring and enforcement of a service contract, according to an embodiment of the present invention.

FIG. 4 is a block diagram illustrating the interactions between primary and sponsored parties for runtime monitoring and enforcement of a service contract, according to an embodiment of the present invention. After the contract has been negotiated and deployed, the primary and sponsored parties enter the runtime stage. One or more applications of the service customer 410 invokes one or more services offered by the service provider 420 and information is exchanged 460. The sponsored parties, sub service providers 440 and 450, monitor 480 the interactions of the primary parties according to the contract 430 specifications, e.g., by notifying 470 one or more primary parties when one or more clauses of the contract are violated. The sponsored roles 440, 450 may also need to exchange information 490 among themselves, e.g., if the tasks specified in the contract are carried out by multiple sponsored parties. In another context, sponsored parties may include payment services or notary services.

Figure 5:
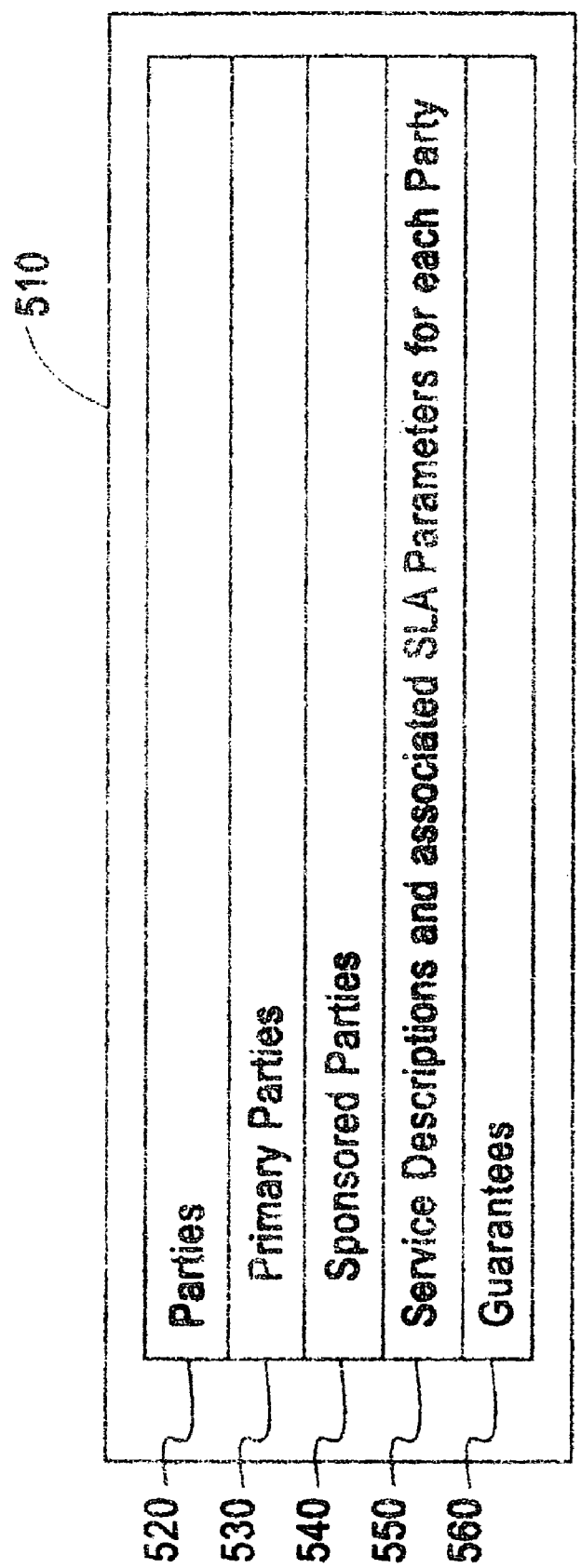
FIG. 5 is a block diagram illustrating the general structure of a service contract with primary and sponsored parties, according to an embodiment of the present invention.

FIG. 5 illustrates preferred elements of a service contract 510 with primary and sponsored roles according to one embodiment of the present invention. There are many variations in the types of information and rules that may be included and, hence, enforced in a particular contract. In a preferred embodiment, service contract 510 may specify fields 520 to 560, identifying parties 520, including primary parties 530 and sponsored parties 540; service descriptions and SLA parameters 550; and guarantees 560. The parties section 520 preferably contains the names, descriptions, references and contacts of the primary 530 and sponsored 540 parties. A second section 550 preferably contains definitions of the service descriptions and the associated SLA parameters for every party, with specifications of how these items are measured and computed. A third section 560 of the contract 510 preferably includes descriptions of the guarantees, i.e., the thresholds against which the SLA parameters are compared, the comparison operators and the corrective actions to be issued whenever a constraint is violated or exceeded. The structure of a preferred service contract is described in greater detail below with reference to FIG. 7.

Figure 6:
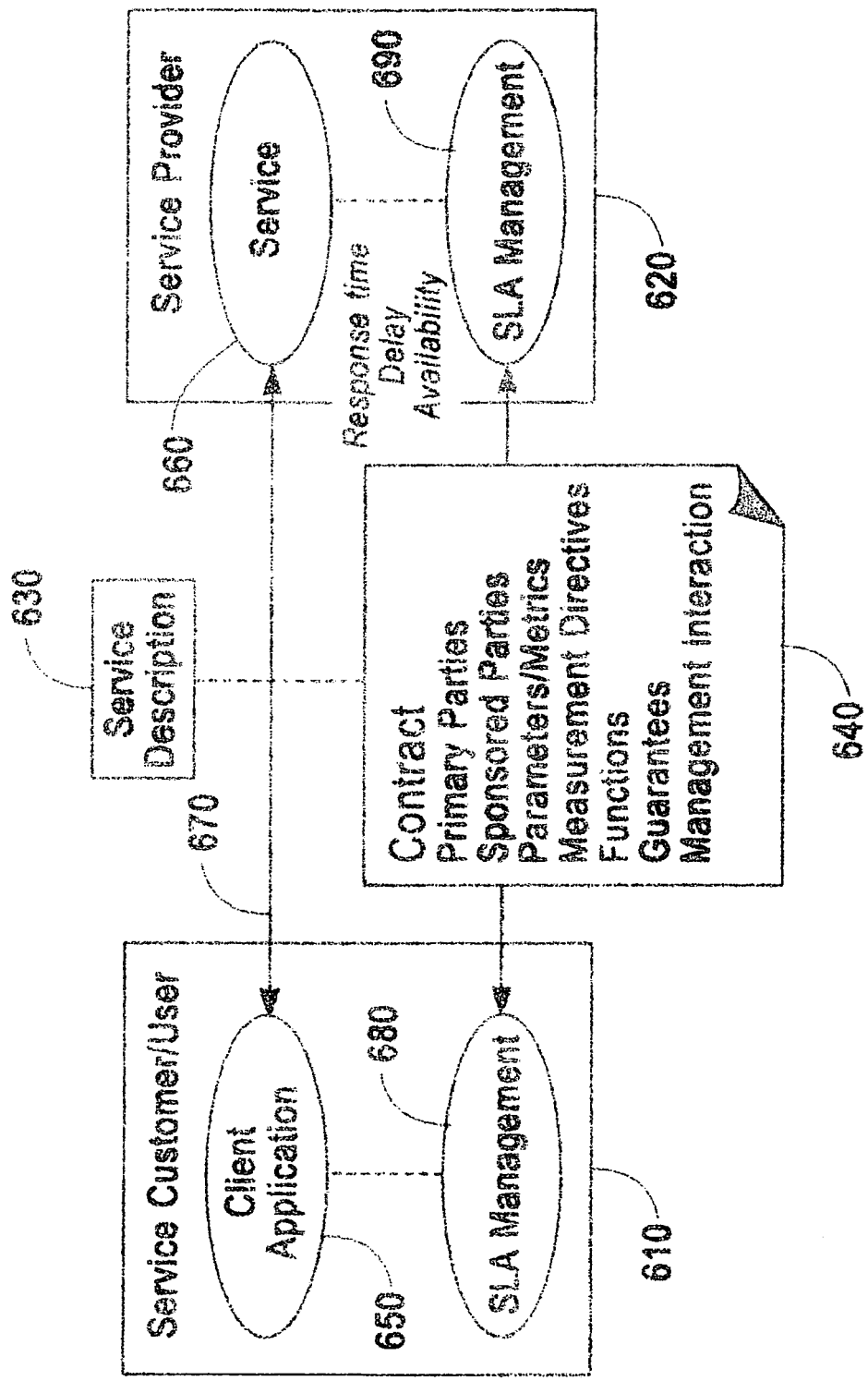
FIG. 6 is a block diagram illustrating the relationships between a service contract and a service description in a customer/provider environment, according to an embodiment of the present invention.

FIG. 6 describes the relationships between a service contract 640 and a service description 630 in an environment that includes a customer/user 610 and provider 620. Service description 630, located in a private or public registry such as UDDI (Universal Discovery, Description and Integration), may contain the production interface of a service 660, which is accessed 670 from client application 650. Contract 640 defines the mutual obligations between parties 610 and 620. Preferably, contract 640 also includes or refers to service description 630 and includes definitions of: relevant service parameters, the way the service's proper functioning is observed, service guarantees, functions and management interactions. Additionally, contract 640 preferably includes the names of primary and sponsored parties taking part in the interaction and the relationships between certain parties for delivering and/or managing a service. Rights and obligations of parties may further be defined in contract 640, such as, for example, an obligation to deliver a service of a specified quality, or an obligation to pay for a service. A definition of rights and obligations may extend to the interaction relationship between contracting parties, e.g., the right to send a measurement probe and the obligation to make measurement data available. The contract 640 may therefore be considered the basis for measuring and enforcing service level agreements; these functions apply to but are not limited to SLA management entities 680, 690, which can be located on the service customer side 610 and/or on the service provider side 620.

Figure 7:
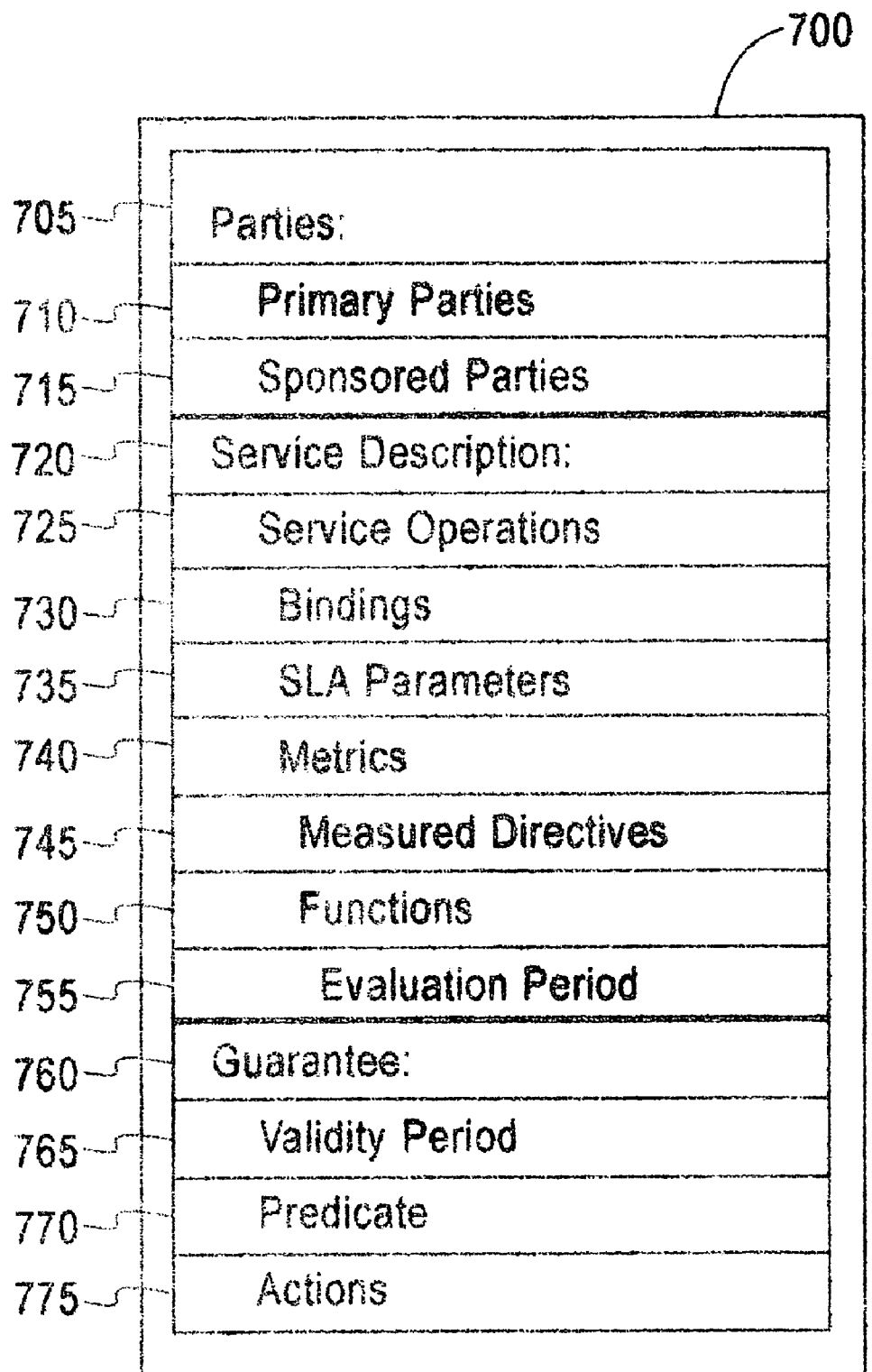
FIG. 7 illustrates the detailed structure of a service contract with primary and sponsored roles, according to an embodiment of the present invention.

FIG. 7 illustrates possible elements of a service contract 700 with primary and sponsored roles according to an embodiment of the present invention. Those of ordinary skill in the art will readily appreciate that there are many alternative elements and combinations of elements that may be included and, hence, enforced in a specific contract. In a preferred embodiment, fields 705 to 775 may be specified in a service contract 700.

One section of contract 700 may identify, for example, parties field 705 and may include fields 710 for primary parties and 715 for sponsored parties so that all the contractual parties are identified. Primary party descriptions preferably contain the identification and technical properties of parties, such as, for example, their interface definitions and their addresses. Descriptions of sponsored parties may contain the types of information supplied for the primary parties as well as, for example, attributes indicating the sponsor(s) of each party.

A second section of contract 700 may be described as the service description 720, which preferably specifies the characteristics of the service and its observable parameters. For every service operation 725, one or more bindings 730 may be specified, wherein "bindings" refers to the transport encoding for the messages to be exchanged. Examples of such bindings include, but are not limited to: SOAP (Simple Object Access Protocol), MIME (Multipurpose Internet Mail Encodings) or HTTP (HyperText Transfer Protocol).

In addition, one or more SLA parameters 735 of service operation 725 may be specified. Examples of such SLA parameters include, but are not limited to: "service availability," "service throughput," or "service response time."

SLA parameters are preferably composed of (composite) metrics 740, which, in turn, aggregate one or more other (composite or base) metrics, according to a measurement directive 745 or a function 750. Examples of composite metrics include, but are not limited to: "maximum response time of a service," "average availability of a service," or "minimum throughput of a service." Examples of base metrics include, but are not limited to: "system uptime," "service outage period," or "number of service invocations." Measurement directives 745 specify how an individual metric can be accessed. Examples of measurement directives include, but are not limited to: the uniform resource identifier of a hosted computer program, a protocol message, or the command for invoking scripts or compiled computer programs.

Functions 750 preferably include a measurement algorithm or formula that specifies the way a composite metric is computed. Examples of functions include, but are not limited to, formulas of arbitrary length containing average, sum, minimum, maximum, and various other arithmetic operators, or time series constructors. For every function, an evaluation period 755 may be specified. Evaluation period 755 preferably defines the time intervals during which functions 750 are executed to compute metrics 740. These time intervals may be specified according to start time, duration, and frequency. Examples of "frequency" include, but are not limited to, weekly, daily, hourly, or every minute.

According to a preferred embodiment, SLA parameters are the result of a computation, i.e., SLA parameters preferably are not defined as input parameters for computing other SLA parameters; measurement directives therefore preferably contain only metrics. However, those of ordinary skill in the art will appreciate that using SLA parameters as input parameters of a measurement directive may be realized without departing from the spirit of the present invention.

Also, according to a preferred embodiment, the linking of SLA parameters to a service is preferably done on a per-operation basis, e.g., SLA parameters are most preferably defined with respect to a specific service operation. Those of ordinary skill in the art will appreciate, however, that linking SLA parameters on a per-service level may be realized without departing from the spirit of the present invention.

Another section of a contract, guarantees 760, defines various constraints that may be imposed on the contract and its SLA parameters: First, a validity period 765 may be specified; it indicates the time intervals for which a given SLA parameter is valid, i.e., whether it is allowed to apply constraints at all. Examples of validity periods include, but are not limited to: business days, regular working hours or maintenance periods. In a preferred embodiment, validity periods are specified with respect to a single SLA parameter, and thus are only indirectly applicable to the scope of the overall contract. However, those of ordinary skill in the art will appreciate that applying validity periods to the overall contract (possibly in addition to the validity periods for each SLA parameter) may be realized without departing from the spirit of the present invention.

Predicate 770 preferably specifies the threshold and the comparison operator (greater than, equal, less than, etc.) against which a computed SLA parameter is to be compared. The result of the predicate is either "true" or "false". Actions 775 are triggered whenever a predicate evaluates to "true", i.e., a violation of a guarantee has occurred. Actions include, but are not limited to: "sending an event to zero or more primary and sponsored parties," "opening a trouble ticket or problem report," "payment of penalty," or "payment of premium." Note that, as stated in the latter case, a service provider may very well receive additional compensation from a customer for exceeding a guarantee, i.e., guarantees reflect constraints that may trigger the payment of credits from any primary party to another primary or sponsored party. Also note that zero or more actions may be specified for every SLA parameter.

Figure 8:
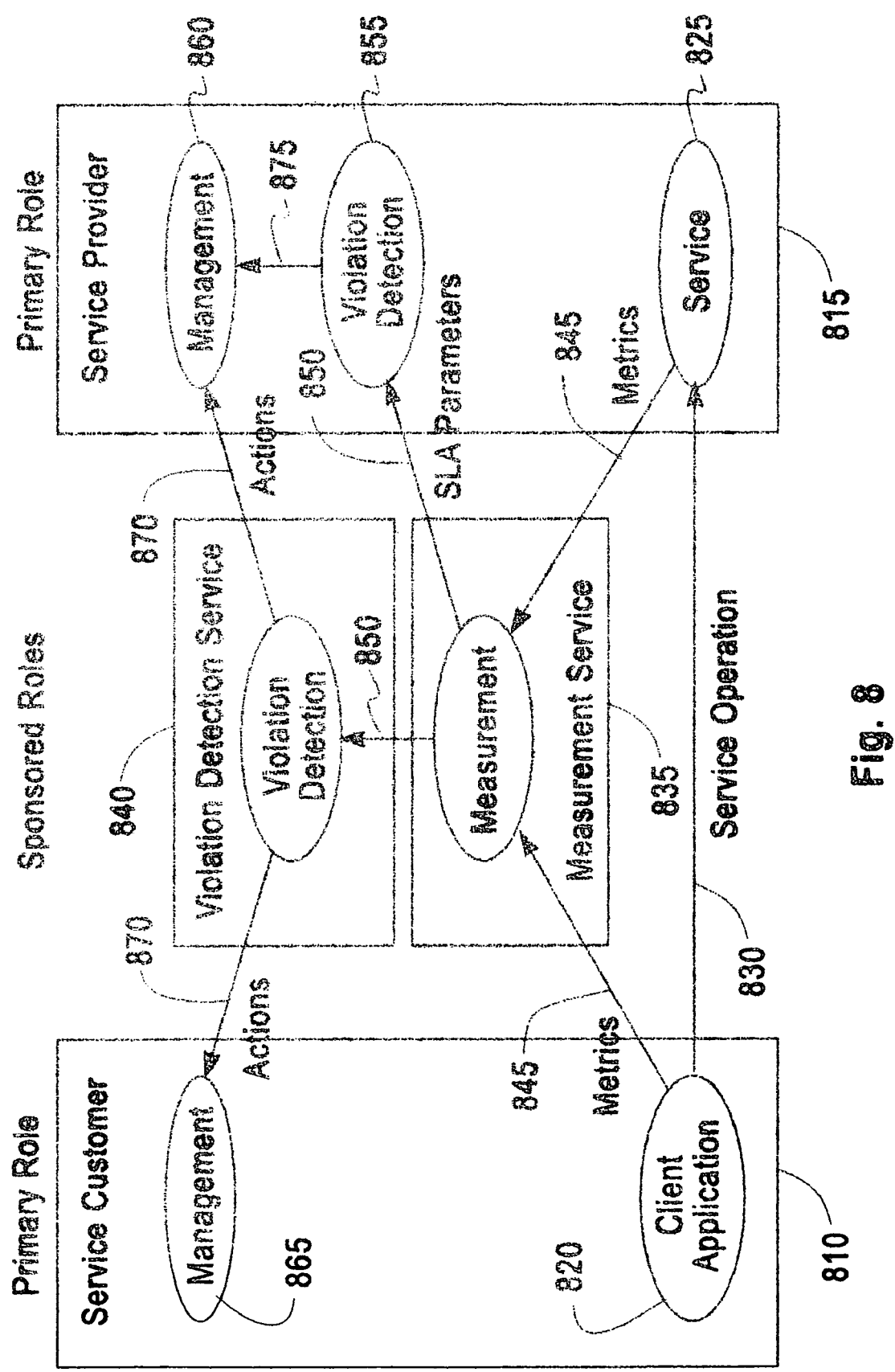
FIG. 8 is a block diagram illustrating the relationships between primary and sponsored roles in a dynamic e-business environment, according to an embodiment of the present invention.

FIG. 8 depicts the relationships between primary and sponsored roles in a customer/provider environment. A client application, located within the organizational domain of a service customer 810, issues service operations on a service, located within the boundaries of a service provider 815. Both service customer 810 and service provider 815 are primary roles. Sponsored roles observe and enforce the proper access and functioning of the service in question. Examples of such sponsored roles include, but are not limited to, a measurement service 835 or a violation detection service 840.

The purpose of measurement service 835 is preferably to measure the metrics 845 exposed by a service 825 and/or a client application 820 during service operation 830. While service metrics provide for accurate monitoring of the service itself, metrics captured at the client application 820 give a sense of how a service customer 810 experiences the performance of a service, eventually from a remote location. SLA parameters are preferably computed by the measurement service from the gathered metrics, according to the measurement directives or algorithms defined in the service contract. This computation allows the collection of various metrics into parameters that may be more meaningful both for a service customer 810 and a service provider 815.

The SLA parameters may then be forwarded 850—according to the definitions in the contract—to a violation detection component, whose primary purpose is preferably to compare the SLA parameters to the guarantees defined in the service contract to verify whether the SLA parameter stays within its allowable range (i.e., within its upper or lower bounds). Note that the violation detection component may be located within the domain of one or more primary parties 855 or it may be provided by a sponsored party, such as, for example, a violation detection service 840. If a violation of a guarantee has been observed by the violation detection component, it preferably notifies the appropriate management components 860, 865, which are usually located within the boundaries of the primary roles. In addition, the violation detection component may propose corrective actions 870, 875 to the management components, according to the specifications of the contract.

Figure 9:
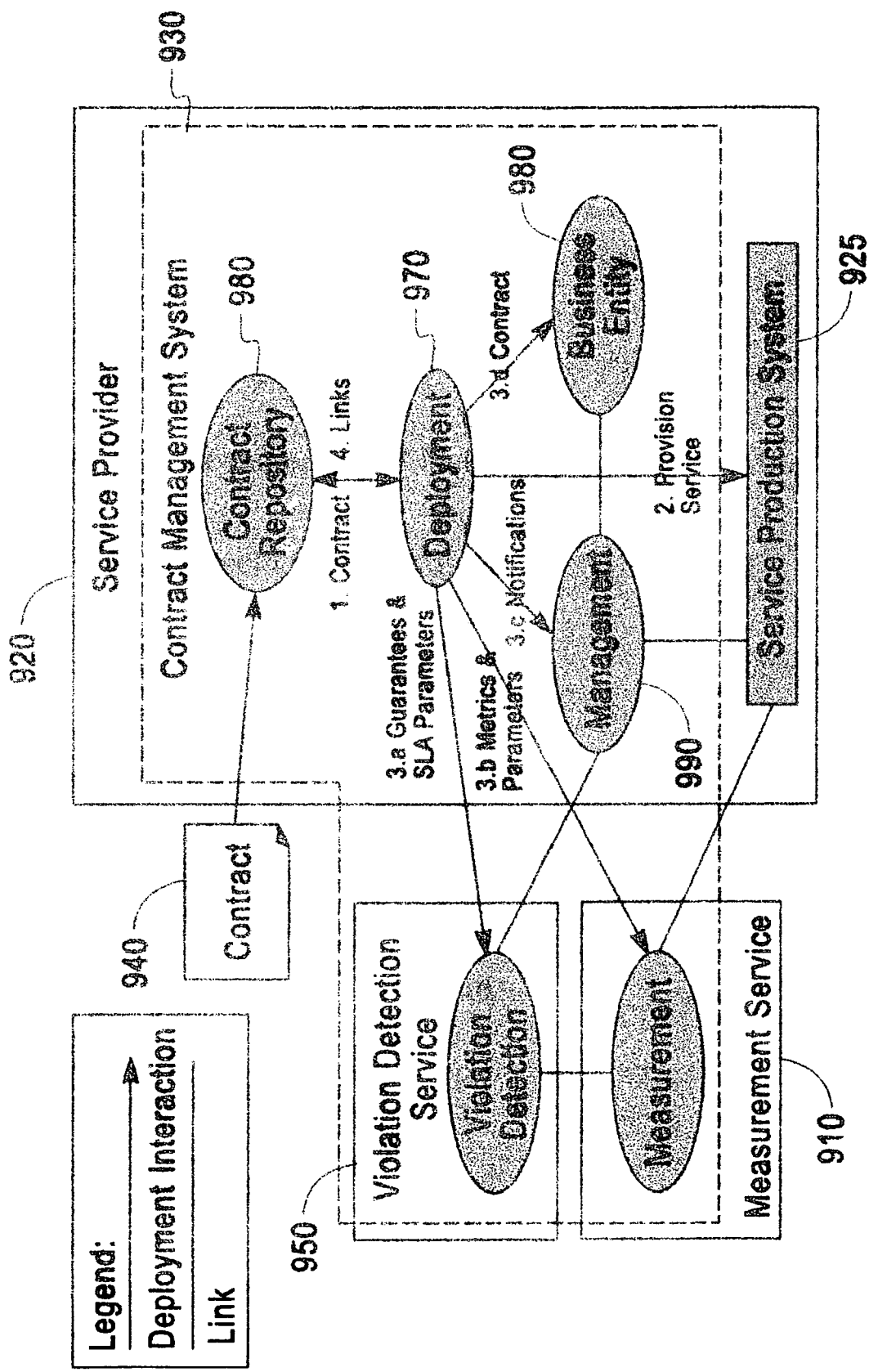
FIG. 9 is a block diagram illustrating the contract deployment process in a dynamic e-business environment, according to an embodiment of the present invention.

FIG. 9 illustrates an example of a contract deployment process in a customer/provider environment, including sponsored parties. Contract deployment refers to the process of provisioning the service and setting up a contract monitoring and management infrastructure. FIG. 9 depicts an illustrative scenario in which a service provider 920 deploys a contract 940. In addition to internal components, there may also be an external violation detection service 950 and a measurement service 910 involved in the measurement and management of the contract. The service provider may run a service production system 925 and the internal components of the corresponding contract management system 930. It is envisioned that there may be various alternative configurations in which, for example, there may be no external roles involved, all functionality may be implemented by the provider, or there may be multiple measurement and violation detection services.

Referring to interactions illustrated in FIG. 9, the deployment procedure may contain four steps, such as, for example:

1. In a first step, deployment component 970 may receive the contract from contract repository 960. Deployment component 970 decides how to provision the service in the service production system 925 and which components to include in the contract management system 930. While external components may be defined in the contract, there is some degree of freedom for deciding which local components will be used for the contract management system 930 and the provisioning of the service production system 925.
2. In a second step, the service is provisioned in the service production system 925. Depending on the type of service, different procedures may be performed, at least some of which may involve processes that need to be performed manually.
3. In a third step, components of the contract management system 930 are set up. Deployment component 970 may instantiate the necessary components, if needed, and may supply them with the parts of the contract that are necessary for them to perform their task(s). Different component types may receive different artifacts of the contract, for example:
    a. A violation detection component 950 may receive the guarantees and the parts of the QoS parameter definition that enable it to retrieve the parameters from the measurement component 910.
    b. A measurement component 910 may retrieve the definition of the metrics to be measured and the corresponding measurement directives and functions.
    c. A management component 990 may receive information regarding which notifications of violations to expect and which actions should be taken.
    d. A business entity 980 may receive the complete contract to enable the necessary decision-making in case violations occur.

In addition to contractual information, internal components need further information to establish links to other internal components, which are not contractually defined.

4. In a fourth step, deployment component 970 reports all linking information back to the contract repository 960 to facilitate the administration of the contract management system 930.

A service customer's deployment is a simplified version of a service provider's deployment. For example, a service customer's deployment does not require the provisioning of a service production system, hence this type of deployment does not need step two. Also, the deployment of additional parties to the contract is triggered by the service provider and therefore does not require the involvement of the service customer.

Figure 10:
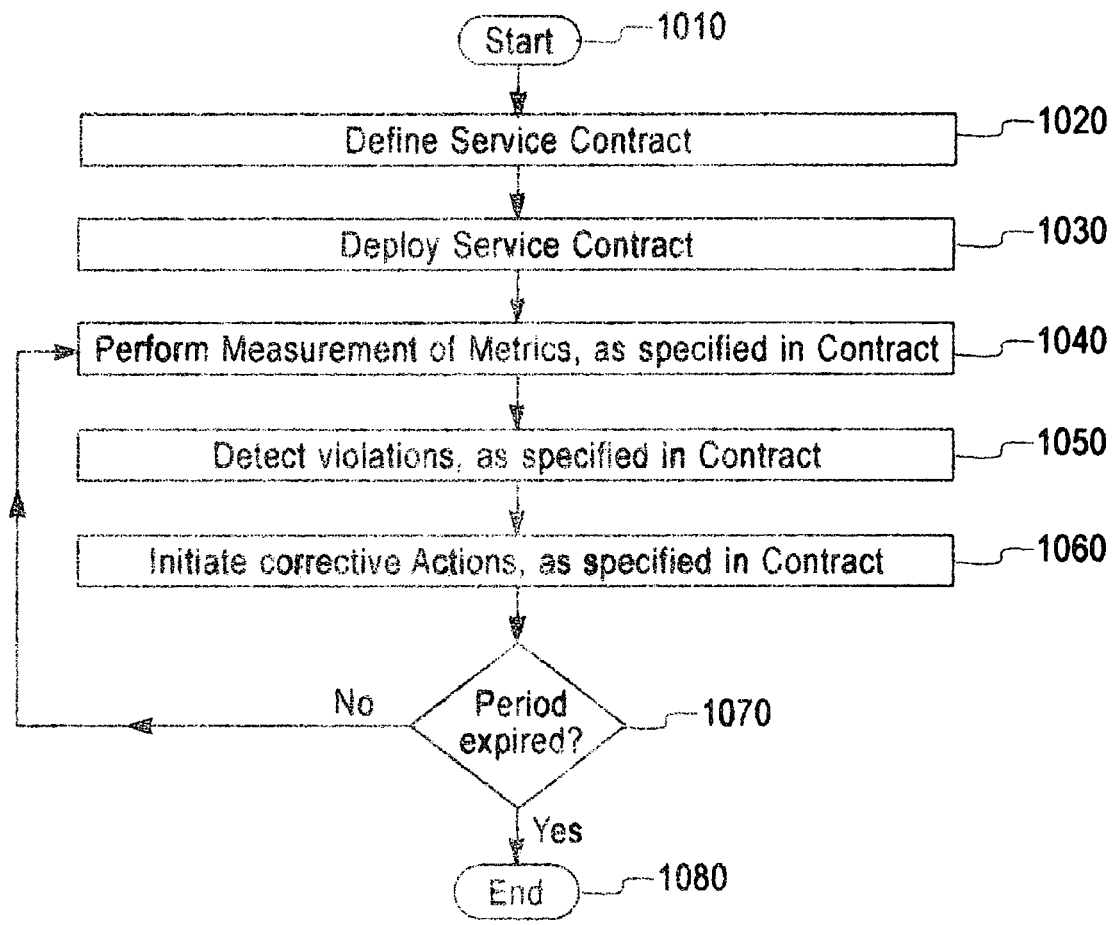
FIG. 10 is a flow diagram illustrating steps of actions within the lifecycle of a service contract according to an embodiment of the present invention.
Figure 11:
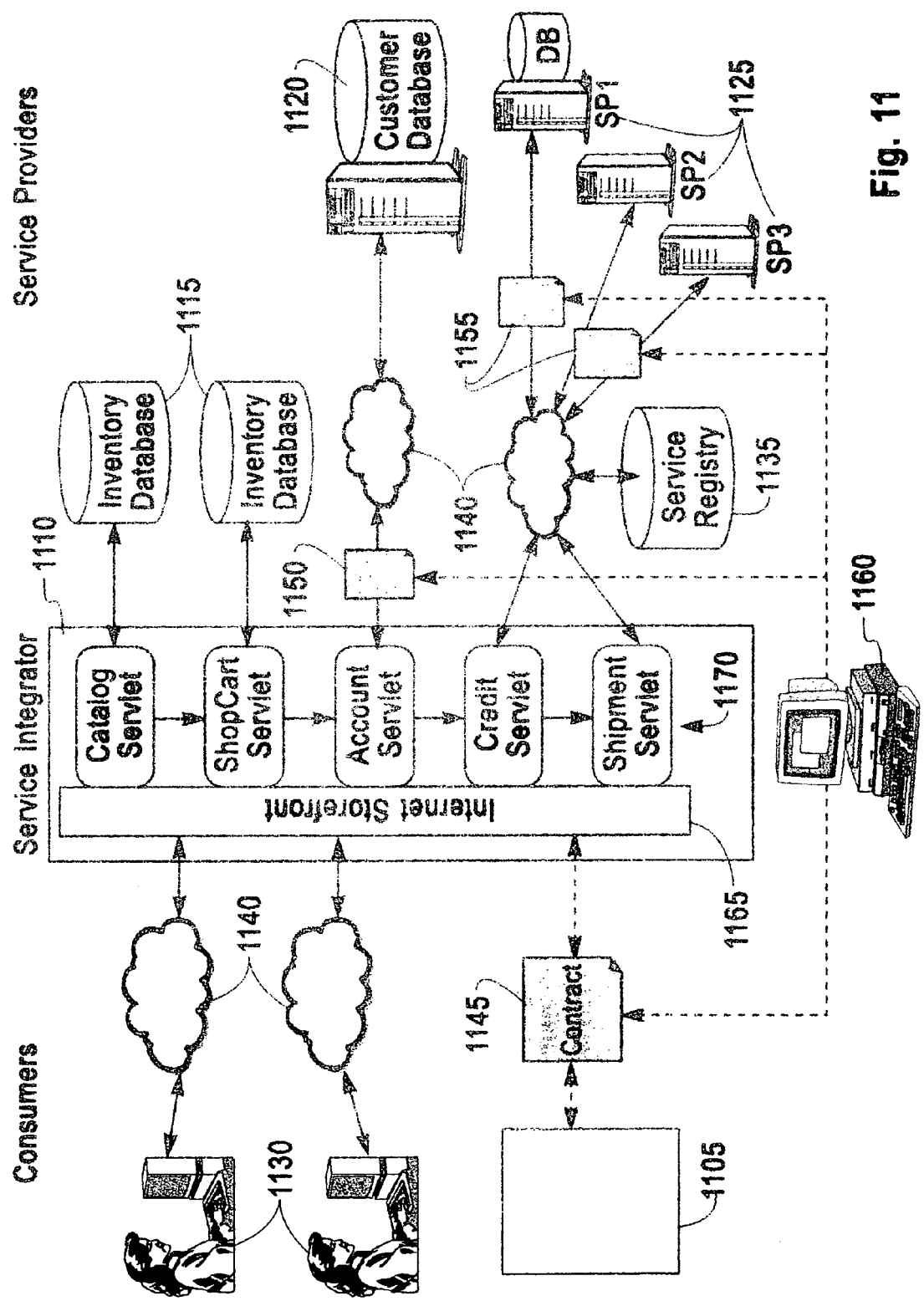
FIG. 11 is a block diagram illustrating an electronic commerce system and the roles of the involved parties, according to an embodiment of the present invention.

Referring now to FIG. 10, a flow diagram illustrates a preferred set of steps of actions within the lifecycle of a service contract. The algorithm begins at block 1010 and proceeds as follows: Negotiations between the primary and sponsored parties lead to the definition and establishment 1020 of a service contract. The service contract or any part thereof is then deployed to the appropriate parties 1030. Note that it is neither necessary nor desired to deploy the contract in its whole to all the participants: A measurement service, for example, is not required to be aware of service guarantees, since the verification of guarantees is beyond its scope. In step 1040, the measurement of metrics and the computation of measurement parameters are carried out, according to measurement directives specified in the service contract. In a subsequent step, the SLA parameters may be compared against the guarantees. If a violation of a guarantee is detected 1050, a corrective action is initiated 1060, according to the contract specification. If the requested data is to be collected only during an appropriate evaluation period and/or validity period, a determination should be made as to whether the respective period(s) is still valid. If it is valid (e.g., the period has not expired) 1070, the algorithm proceeds to block 1040. Otherwise, the algorithm ends at block 1080. FIG. 11 depicts an embodiment of the invention, namely the formation, deployment and execution of a dynamic e-business environment. Our example is directed towards a small to medium-sized business entity that wishes to outsource its business process, entirely or in part, to appropriate service providers. The entities that participate in a dynamic e-business may be as described below.

We assume a dynamic e-business infrastructure for a Storefront Owner 1105 that wishes to construct and operate an electronic storefront 1165 for selling goods. FIG. 11 depicts a typical setup where the business process associated with the operation of an Internet storefront has been set up to be hosted by a number of different service providers.

In the example shown, the business process 1170 has a fairly straightforward flow, which includes: catalog presentation, shopping cart handling, user account maintenance and profiling, credit verification and shipment. Potentially each of these sub-processes could be outsourced to an appropriate Service Provider, depending on the ability of the Storefront Owner 1105 to maintain the IT infrastructure needed for supporting them.

The Storefront Owner 1105 may be described as a customer of Service Integrator 1110. Additional players may be needed when service customers buy services to be consumed by third parties. In the example of FIG. 11, the storefront 1165 is outsourced by a Storefront Owner 1105 who intends that the storefront be used by its Consumers 1130, connecting over the Internet 1140. A typical real-life example of a storefront service offering, which caters to small and medium businesses, is Yahoo! Store (company web site http://store.yahoo.com).

In the scenario depicted in FIG. 11, the catalog representation and shopping cart handling processes are provided "in-house" 1115 by service integrator 1110. However, a service integrator 1110 may choose not to implement all the services needed to support the business processes by himself, but to subcontract one or more parts of the fulfillment to other service providers. Each outsourced process is governed by an electronic contract 1145, 1150, 1155, formed by negotiations. In the illustrated example, account maintenance, credit and shipment are subcontracted to other service providers.

The relationship of a service integrator 1110 to its service provider is substantially the same as the relationship of a customer (here, the Storefront Owner 1105) to a service provider. The service relationships may be bilateral. This means that the relationship between a service customer 1105 and service integrator 1110 may be decoupled from the relationship between a service integrator and an actual service provider. The mapping of subcontracted services to the service provided to the customer may be done internally by the service integrator. By treating each service relationship and the corresponding management independently, this model of contractual relationships supports value chains of arbitrary depth. In the scenario of FIG. 11, the Service Integrator 1110 has chosen to outsource the maintenance of the customer database (which is needed for the fulfillment of the account maintenance business process) to another service provider, termed long-term SP 1120 because such a "classical" outsourcing contract 1150 is usually valid for a relatively long period of time.

Dynamic Service Providers 1125 (depicted in the lower right part of the figure) enter the scene if we consider emerging architectures such as, for example, Web Services and Universal Description, Discovery and Integration (UDDI), which define mechanisms for advertising, finding, and binding to services over the Internet. While UDDI defines the architecture of a Service Registry 1135 and mechanisms to access service registries, Web Services specifies a component model for describing and invoking services over the Internet. UDDI and Web Services are the building blocks that enable a Service Integrator 1110 to perform very late binding to other Service Providers, in the extreme case on a per-transaction basis. In our example, the Credit and Shipment business processes are fulfilled by Dynamic Service Providers 1125.

Often, a customer may not have the infrastructure to supervise services, or the customer may not access the services from his environment on a regular basis. In such situations, the Storefront Owner 1105 and/or the Service Integrator 1110 may select a third party entity to oversee the electronic contracts formed between the various customer/provider relationships. Management Service Provider (MSP) 1160 is an example of such a third party entity. Service management may include additional parties, but every service provider is solely responsible for the delivery of its service. Typical functions performed by the MSP 1160 may include, for example:

Provisioning the management functionality such that the various measurement service providers are instructed to measure the relevant metrics in support of the agreed upon SLAs;

Contract monitoring for SLA violation detection;

Reporting of SLA violations;

Problem determination and resolution;

Performance data reporting: Keynote Systems (web site http://www.keynote.com) is a typical example of such an MSP.

These functions may be performed either by one or by multiple entities, e.g., a management service provider may simultaneously offer a measurement service, a violation detection service and a management service. For instance, provisioning and problem determination may be done by one entity which may be an integral part of the service integrator 1110, whereas contract monitoring and SLA violation detection may be done by an agreed upon sponsored party, such as a management service provider 1160.

Figure 12:
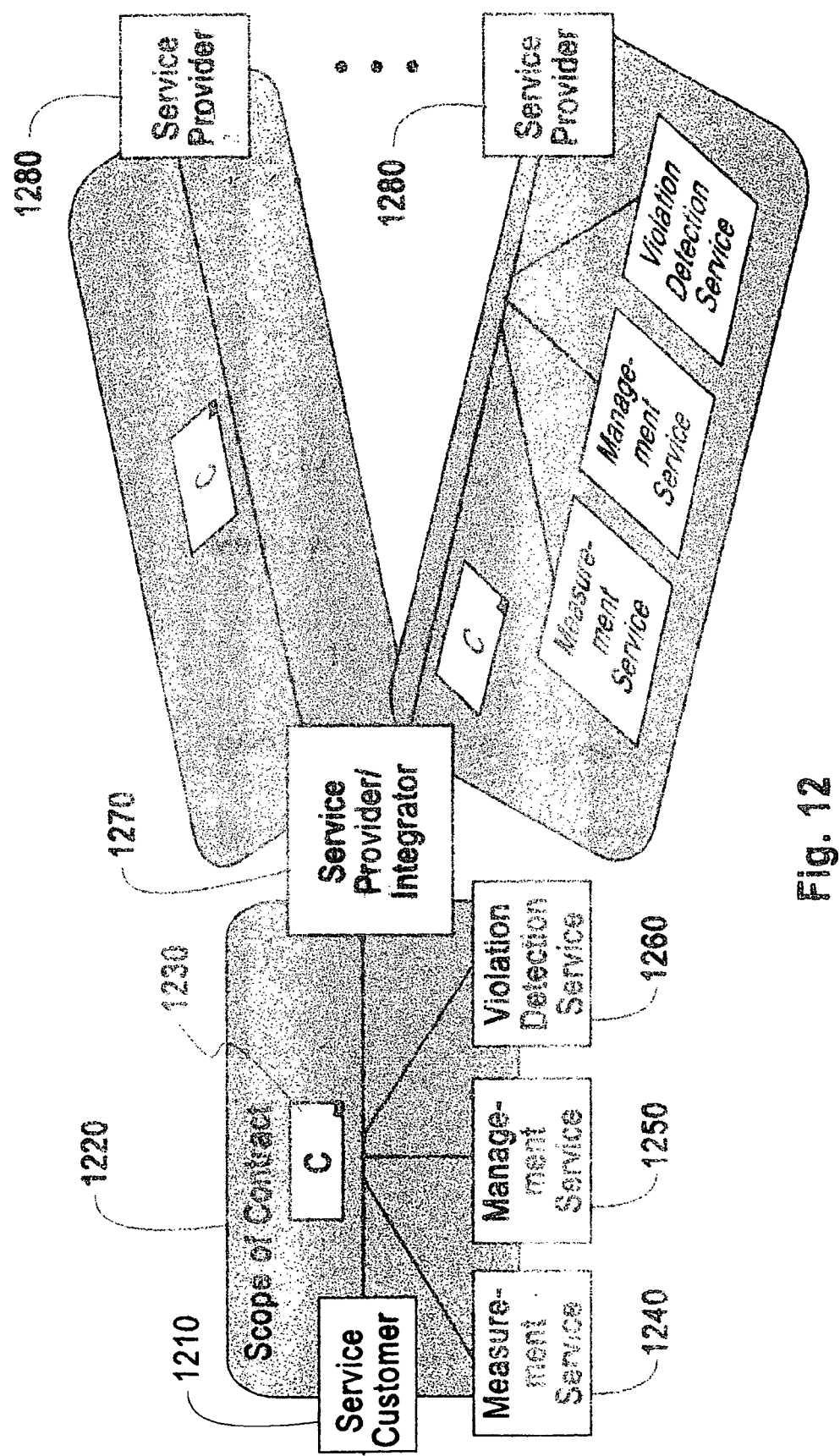
FIG. 12 is a block diagram illustrating the scope of a service contract in a dynamic e-business environment, according to an embodiment of the present invention.

FIG. 12 illustrates the scope 1220 of a service contract 1230 in a dynamic e-business environment. The scope of a contract preferably includes the set of rights and obligations of the parties involved and describes the relationship between the parties. From the point of view of service management, the scope of the contract 1230 preferably encompasses two important aspects:

1. the (potentially nested) bilateral service relationships between a service provider 1270, 1280 and its customer 1210, 1270 (a service integrator may fulfill both customer and service provider roles); and 2. the service management, which may include additional parties that contribute in various roles.

The service relationship is preferably defined in a bilateral contract (e.g., 1230) between a service provider (e.g., 1270) and a service customer (e.g., 1210). The contract may define the service that the service provider must deliver and how the fulfillment of the contract is going to be managed. This includes the specification of the Quality of Service (QoS) parameters, the way they are measured, their guaranteed values and any punitive action that is to take place in response to a guarantee violation, e.g., the crediting of a penalty. A service provider is fully accountable for the delivery of the service as specified by the QoS parameters.

The service management aspect complements the service relationship. It defines the necessary interactions to measure the relevant QoS parameters, exchange measured values, determine problems and launch corrective actions. The contracting parties may decide to include other parties in the monitoring and management of their contractual relationship, in the form of sponsored parties: In addition to the (mandatory) service provider and service customer, sponsored parties in additional roles may be part of the contractual relationship. Sponsored parties may perform activities that service provider and consumer do not or cannot do by themselves, e.g., the management of the contract.

Depending on the particular environment, there may be various additional roles for sponsored parties, based upon the needs of the primary parties and the viability of a particular role being run as an independent business. The following services are typical additional roles:

1. Measurement Service 1240: This service preferably measures QoS parameters such as availability or response time from outside the service provider 1270, e.g., by probing or interception of client invocations. A measurement service 1240 may measure all or a subset of the QoS parameters. Multiple measurement services may be involved.

2. Violation Detection Service 1260: This service obtains measured values of QoS parameters from the service provider 1270 or a measurement service 1240 and tests them against the guarantees given in the contract 1230. This may be done each time a new value is available, or periodically.

3. Management Service 1250: The purpose of this service is to execute corrective actions on behalf of the managed environment if the Violation Detection Service 1260 discovers that a term of the contract 1230 has been violated. While such corrective actions are limited in the known art to opening a trouble ticket or sending an event to the provider's management system, the management service component 1250 of the present invention acts as an automated mediator between the customer 1210 and provider 1270, according to the terms of the contract. This includes the submission of proposals to the management system of a service provider on how a performance problem could be resolved (e.g., proposing to assign a different traffic category to a customer if several categories have been defined in the contract).

Those of ordinary skill in the art will appreciate that further services may be added without departing from the spirit of the present invention.

Despite the fact that a multitude of parties may be involved in providing a service, their interactions may be broken down into chained customer/provider relationships. Every interaction therefore involves only two parties, a customer and a provider (e.g., 1210 and 1270, or 1270 and 1280, respectively). However, those of ordinary skill in the art will appreciate that the use of multi-party contracts (i.e., contracts that are negotiated and signed by more than two parties) does not depart from the spirit of the present invention.

Figure 13:
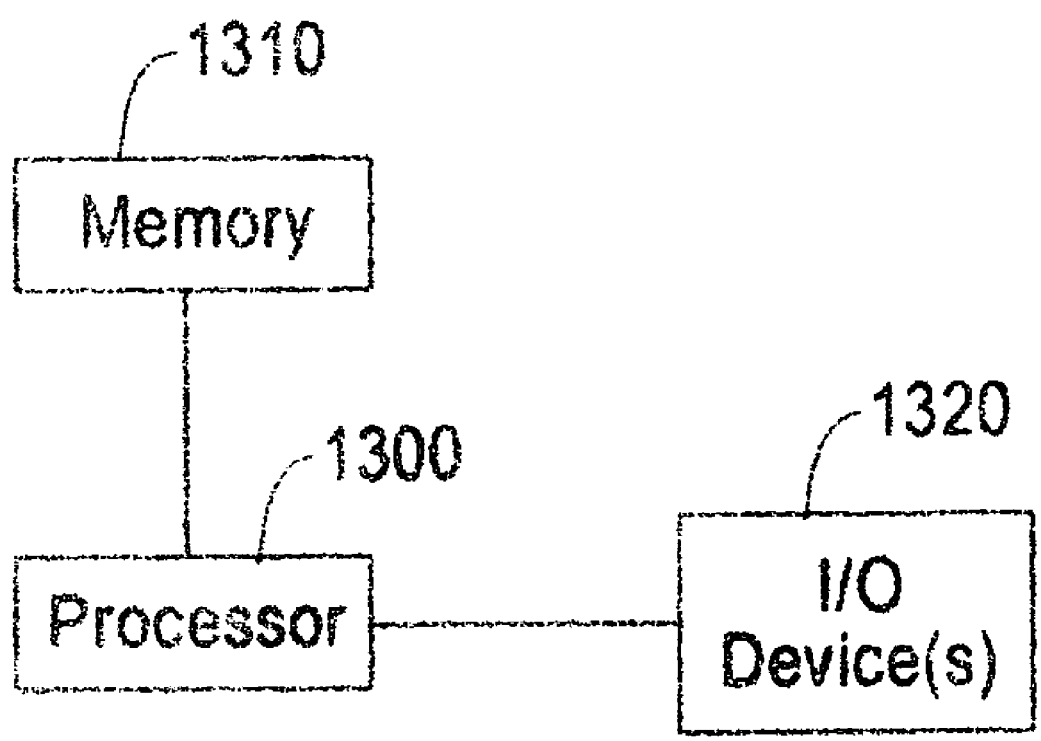
FIG. 13 is block diagram illustrating a generalized hardware architecture of a computer system suitable for implementing an electronic business service system according to the present invention.

Referring now to FIG. 13, a block diagram is shown illustrating a generalized hardware architecture of a computer system suitable for implementing one or more of the functional components of the electronic business service system as depicted in the figures and explained in detail herein.

As shown, the computer system may be implemented in accordance with a processor 1300, a memory 1310 and I/O devices 1320. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-based method for use in an electronic business service environment, the method comprising the steps of:

constructing an electronic service contract between at least two primary parties, wherein the primary parties comprise a service provider and a service customer, and wherein the electronic service contract includes specifications for configuration by the primary parties and by at least one sponsored party, the specifications including network performance goals modifiable by any one of the primary parties or the at least one sponsored party; and deploying the electronic service contract to at least one of the parties to configure a computer to implement a service in accordance with specifications in the electronic service contract.

2. The method of claim 1, wherein one of the primary parties sponsors the at least one sponsored party.

3. The method of claim 1, further comprising the step of executing the constructed electronic service contract.

4. The method of claim 1, wherein at least a portion of the electronic service contract is one of monitored, enforced and managed by at least one sponsored party.

5. The method of claim 1, wherein the at least one sponsored party is a business entity that is distinct from the primary parties.

6. The method of claim 1, wherein the electronic service contract comprises one or more service level agreements.

7. The method of claim 6, wherein the one or more service level agreements are deployed to the at least one sponsored party for monitoring in accordance with instructions defined in the electronic service contract.

8. The method of claim 1, wherein one or more primary parties is notified by the at least one sponsored party in response to a violation of a portion of the electronic service contract.

9. The method of claim 1, further comprising the step of outsourcing at least a portion of the tasks associated with the execution of the service.

10. The method of claim 1, wherein at least one task associated with measuring, monitoring and managing the electronic service contract is outsourced to the at least one sponsored party.

11. The method of claim 10, wherein the at least one sponsored party is at least an additional service provider.

12. The method of claim 1, wherein the primary parties comprise the service provider, the service customer, and at least one additional entity in a multi-party electronic service contract.

13. The method of claim 1, wherein the step of deploying the electronic service contract further comprises the step of setting up a contract monitoring and management infrastructure.

14. The method of claim 1, further comprising the step of maintaining information on system configuration.

15. The method of claim 1, further comprising the step of detecting whether a violation of a least a portion of the contract occurs and proposing corrective actions to a management component.

16. The method of claim 1, further comprising enforcing corrective actions in accordance with specifications in the electronic service contract.

17. The method of claim 16, wherein the corrective actions are enforced in response to input associated with a violation detection component.

18. Apparatus for use in an electronic business service environment, the apparatus comprising at least one processor operative to:

construct an electronic service contract between at least two primary parties, wherein the primary parties comprise a service provider and a service customer, and wherein the electronic service contract includes specifications for configuration by the primary parties and by at least one sponsored party, the specifications including network performance goals modifiable by any one of the primary parties or the at least one sponsored party; and provide for deployment of the electronic service contract to at least one of the parties to configure a computer to implement a service in accordance with specifications in the electronic service contract.

19. The apparatus of claim 18, wherein one of the primary parties to the contract sponsors the at least one sponsored party.

20. The apparatus of claim 18, wherein the at least one processor is further operative to execute the constructed electronic service contract.

21. The apparatus of claim 18, wherein at least a portion of the electronic service contract is one of monitored, enforced and managed by at least one sponsored party.

22. The apparatus of claim 18, wherein the at least one sponsored party is a business entity that is distinct from the primary parties.

23. The apparatus of claim 18, wherein the electronic service contract comprises one or more service level agreements.

24. The apparatus of claim 23, wherein the one or more service level agreements are deployed to the at least one sponsored party for monitoring in accordance with instructions defined in the electronic service contract.

25. The apparatus of claim 18, wherein the at least one processor is further operative to provide a notice to one or more primary parties from the at least one sponsored party in response to a violation of a portion of the electronic service contract.

26. The apparatus of claim 18, wherein the at least one processor is further operative to outsource at least a portion of the tasks associated with the execution of the electronic service contract.

27. The apparatus of claim 26, wherein the at least a portion of the tasks associated with the execution of the electronic service contract are outsourced to the at least one sponsored party.

28. The apparatus of claim 27, wherein the at least one sponsored party is at least an additional service provider.

29. The apparatus of claim 18, wherein the primary parties comprise the service provider, the service customer, and at least one additional entity in a multi-party electronic service contract.

30. An article of manufacture for use in an electronic business service environment, comprising a machine readable medium containing one or more programs which when executed implement the steps of:

constructing an electronic service contract between at least two primary parties, wherein the primary parties comprise a service provider and a service customer, and wherein the electronic service contract includes specifications for configuration by the primary parties and by at least one sponsored party, the specifications including network performance goals modifiable by any one of the primary parties or the at least one sponsored party; and deploying the electronic service contract to at least one of the parties to configure a computer to implement a service in accordance with specifications in the electronic service contract.

31. A computer-based system for use in an electronic business service environment, the system comprising:

a contract building component for constructing an electronic service contract between at least two primary parties, wherein the primary parties comprise a service provider and a service customer, and wherein the electronic service contract includes specifications for configuration by the primary parties and by at least one sponsored party, the specifications including network performance goals modifiable by any one of the primary parties or the at least one sponsored party;

a deployment component for deploying the electronic service contract to at least one of the parties to configure a computer to implement a service in accordance with specifications in the electronic service contract;

a measurement component for maintaining information on system configuration;

a violation detection component for at least one of detecting whether a violation of at least a portion of the contract occurs and proposing corrective actions to a management component; and a management component for enforcing corrective actions in accordance with specifications in the electronic service contract.

* * * * *